(12) United States Patent
Kim et al.

(10) Patent No.: US 7,590,537 B2
(45) Date of Patent: Sep. 15, 2009

(54) SPEAKER CLUSTERING AND ADAPTATION METHOD BASED ON THE HMM MODEL VARIATION INFORMATION AND ITS APPARATUS FOR SPEECH RECOGNITION

(75) Inventors: Namhoon Kim, Suwon-si (KR);
Injeong Choi, Hwaseong-si (KR);
Yoonkyung Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 700 days.

(21) Appl. No.: 11/020,302

(22) Filed: Dec. 27, 2004

(65) Prior Publication Data
US 2005/0182626 A1 Aug. 18, 2005

(30) Foreign Application Priority Data
Feb. 18, 2004 (KR) .................. 10-2004-0010663

(51) Int. Cl.
*G10L 15/06* (2006.01)
*G10L 15/00* (2006.01)
*G10L 17/00* (2006.01)

(52) U.S. Cl. ................ 704/245; 704/236; 704/238; 704/239; 704/242; 704/243; 704/246; 704/247; 704/249; 704/250

(58) Field of Classification Search ............ 704/236, 704/238, 239, 245, 242
See application file for complete search history.

(56) References Cited

U.S. PATENT DOCUMENTS 5,598,507 A * 1/1997 Kimber et al. ............ 704/246

(Continued)

FOREIGN PATENT DOCUMENTS

JP 2000-259169 9/2000

(Continued)

OTHER PUBLICATIONS

Ferhatosmanoglu, H., Agrawal, D., and Abbadi, A. E. 2001. Efficient processing of conical queries. In Proceedings of the Tenth international Conference on information and Knowledge Management (Atlanta, Georgia, USA, Oct. 5-10, 2001). H. Paques, L. Liu, and D. Grossman, Eds. CIKM '01. ACM Press, New York, NY, 1-8. DOI= http://doi.acm.org/10.11.*

(Continued)

*Primary Examiner*—David R Hudspeth
*Assistant Examiner*—Paras Shah
(74) *Attorney, Agent, or Firm*—Staas & Halsey LLP

(57) ABSTRACT

A speech recognition method and apparatus perform speaker clustering and speaker adaptation using average model variation information over speakers while analyzing the quantity variation amount and the directional variation amount. In the speaker clustering method, a speaker group model variation is generated based on the model variation between a speaker-independent model and a training speaker ML model. In the speaker adaptation method, the model in which the model variation between a test speaker ML model and a speaker group ML model to which the test speaker belongs which is most similar to a training speaker group model variation is found, and speaker adaptation is performed on the found model. Herein, the model variation in the speaker clustering and the speaker adaptation are calculated while analyzing both the quantity variation amount and the directional variation amount. The present invention may be applied to any speaker adaptation algorithm of MLLR and MAP.

25 Claims, 8 Drawing Sheets

U.S. PATENT DOCUMENTS

| | | | |
|---|---|---|---|
| 5,787,394 A | | 7/1998 | Bahl et al. |
| 5,864,810 A | * | 1/1999 | Digalakis et al. ............ 704/255 |
| 5,895,447 A | * | 4/1999 | Ittycheriah et al. .......... 704/231 |
| 5,983,178 A | * | 11/1999 | Naito et al. ................. 704/245 |
| 6,073,096 A | * | 6/2000 | Gao et al. ................... 704/245 |
| 6,226,612 B1 | * | 5/2001 | Srenger et al. ........... 704/256.2 |
| 6,253,181 B1 | * | 6/2001 | Junqua ....................... 704/255 |
| 6,272,462 B1 | * | 8/2001 | Nguyen et al. .............. 704/244 |
| 6,343,267 B1 | * | 1/2002 | Kuhn et al. ................. 704/222 |
| 6,442,519 B1 | * | 8/2002 | Kanevsky et al. ........... 704/243 |
| 6,526,379 B1 | * | 2/2003 | Rigazio et al. .............. 704/245 |
| 6,567,776 B1 | * | 5/2003 | Chang et al. ................ 704/236 |
| 6,748,356 B1 | * | 6/2004 | Beigi et al. ................. 704/245 |
| 6,751,590 B1 | * | 6/2004 | Chaudhari et al. ........... 704/246 |
| 6,799,162 B1 | * | 9/2004 | Goronzy et al. ............. 704/244 |
| 6,915,260 B2 | * | 7/2005 | Botterweck ................. 704/250 |
| 7,137,062 B2 | * | 11/2006 | Kaufman et al. ............ 715/500 |
| 7,171,360 B2 | * | 1/2007 | Huang et al. ................ 704/245 |
| 7,328,154 B2 | * | 2/2008 | Mutel et al. ................. 704/245 |
| 7,437,289 B2 | * | 10/2008 | Chaudhari et al. .......... 704/244 |
| 7,523,034 B2 | * | 4/2009 | Deligne et al. .............. 704/251 |
| 2004/0138893 A1 | * | 7/2004 | Mochary et al. ............ 704/277 |
| 2004/0162728 A1 | * | 8/2004 | Thomson et al. ............ 704/255 |
| 2007/0129944 A1 | * | 6/2007 | Luan et al. .................. 704/246 |

FOREIGN PATENT DOCUMENTS

| | | | |
|---|---|---|---|
| JP | 2003-099083 | | 4/2003 |
| KR | 0038049 | * | 10/2001 |
| KR | 2004-0008547 | | 1/2004 |

OTHER PUBLICATIONS

Vinciarelli, A.; Bengio, S.; Bunke, H., "Offline recognition of large vocabulary cursive handwritten text," Document Analysis and Recognition, 2003. Proceedings. Seventh International Conference on, vol., No., pp. 1101-1105, Aug. 3-6, 2003.*

Cheng Wu; Lubesnky, D.; Zhong-Hua Wang, "Speaker adaptation for telephony data using speaker clustering," Signal Processing Proceedings, 2000. WCCC-ICSP 2000. 5th International Conference on, vol. 2, No., pp. 768-771 vol. 2, 2000.*

Mori, K.; Nakagawa, S., "Speaker change detection and speaker clustering using VQ distortion for broadcast news speech recognition," Acoustics, Speech, and Signal Processing, 2001. Proceedings. (ICASSP '01). 2001 IEEE International Conference on, vol. 1, No., pp. 413-416 vol. 1, 2001.*

IEEE Transaction on speech and audio processing, vol. 8, No. 6, pp. 695-707, "Rapid Speaker Adaption in Eigenvoice Space," published in Nov. 2000 (in English).

Korean Patent Office Action for corresponding Korean Patent Application No. 10-2004-0010663 dated Jan. 27, 2006.

"Improved Acoustic Modeling for HMMs Using Linear Transformations", 1995, C.J. Leggetter, Dissertation submitted to the University of Cambridge for the degree of Doctor of Philosophy.

* cited by examiner

QUANTITY VARIATION AMOUNT OF MODEL A

QUANTITY VARIATIO AMOUNT OF MODEL B

DIRECTIONAL VARIATION AMOUNT OF MODEL A

DIRECTIONAL VARIATION AMOUNT OF MODEL B

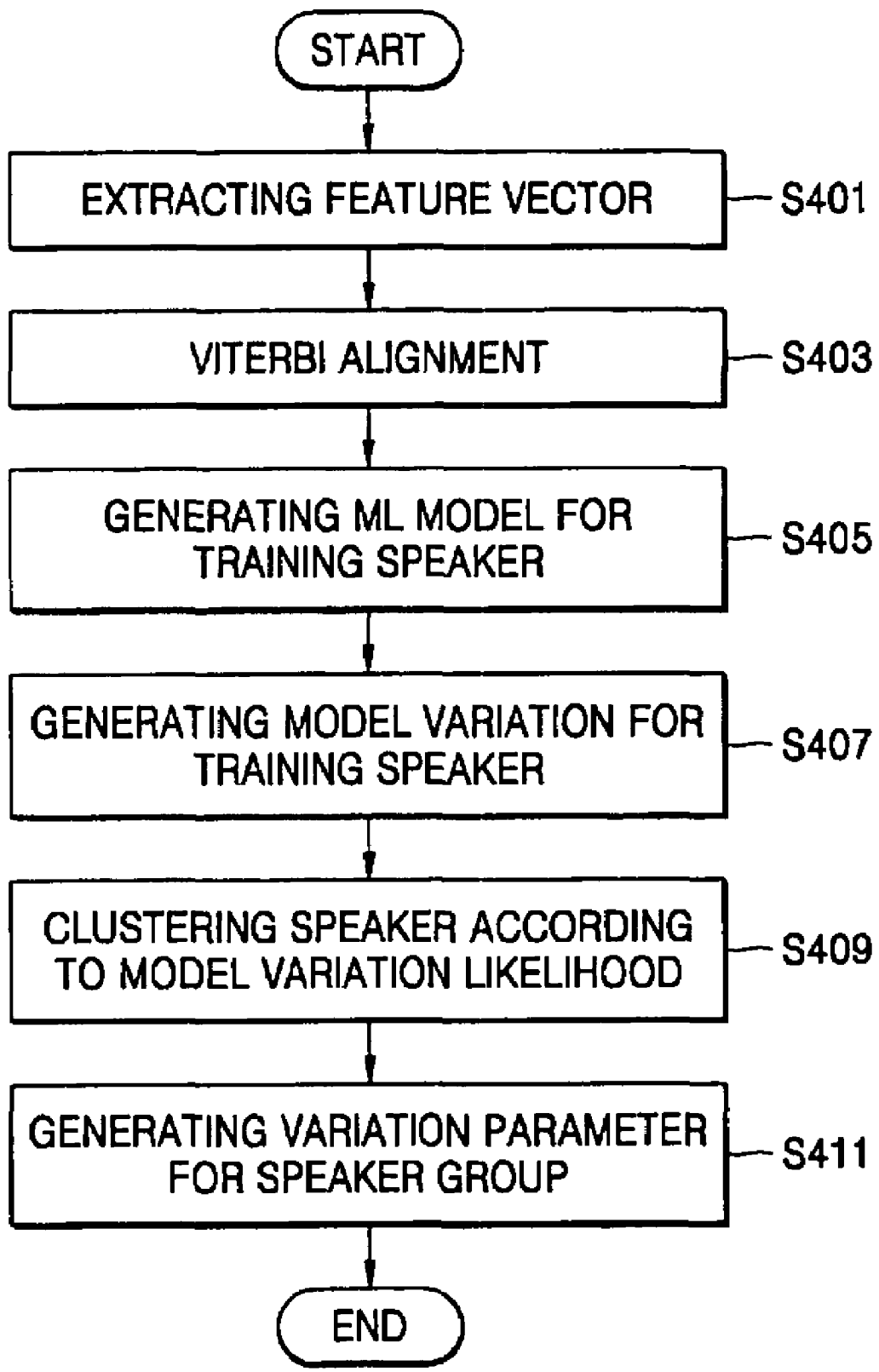

| KIND OF MODEL | WEIGHT(α) | CLASSIFICATION | WER(%) | RELATIVE WER REDUCTION TO SI(%) |
|---|---|---|---|---|
| SPEAKER INDEPENDENT MODEL | - | - | 3.98 | - |
| SPEAKER ADAPTATION MODEL | | COMPARATIVE EXAMPLE 1 | 3.39 | 14.8 |
| | | COMPARATIVE EXAMPLE 2 | 3.16 | 20.6 |
| | ∞ | COMPARATIVE EXAMPLE 1 | 2.94 | 26.1 |
| | 0 | COMPARATIVE EXAMPLE 2 | 2.78 | 30.2 |
| | 1 | COMPARATIVE EXAMPLE 3 | 2.79 | 29.9 |

FIG. 9

| KIND OF MODEL | THE NUMBER OF SPEAKER CLUSTERS | CLASSIFICATION | WER(%) | RELATIVE WER REDUCTION TO SI(%) |
|---|---|---|---|---|
| SPEAKER INDEPENDENT MODEL | - | - | 3.98 | - |
| SPEAKER ADAPTATION MODEL | 8 | COMPARATIVE EXAMPLE 4 | 2.61 | 34.4 |
| | 16 | COMPARATIVE EXAMPLE 5 | 2.62 | 34.2 |

SPEAKER CLUSTERING AND ADAPTATION METHOD BASED ON THE HMM MODEL VARIATION INFORMATION AND ITS APPARATUS FOR SPEECH RECOGNITION

CROSS-REFERENCE TO RELATED APPLICATIONS

This application claims the priority of Korean Patent Application No. 2004-10663, filed on Feb. 18, 2004, in the Korean Intellectual Property Office, the disclosure of which is incorporated herein in its entirety by reference.

BACKGROUND OF THE INVENTION

1. Field of the Invention

The present invention relates to a method and an apparatus for both speaker clustering and speaker adaptation based on the HMM model variation information. In particular, the present invention includes a method and an apparatus that yield an improved performance of automatic speech recognition in that it utilizes the average of model variation information over speakers. In addition, the present invention does not analyze only information on the quantity variation amount of model variation, but also analyzes information with respect to the directional variation amount.

2. Description of the Related Art

A speech recognition system is based on the correlation between speech and its characterization in an acoustic space for the speech. The characterization is typically obtained from training data.

The Speaker-Independent (SI) system is trained using a large amount of data acquired from a plurality of speakers, and acoustic model parameters are obtained as averages of speaker differences, yielding a limited modeling accuracy for each individual speaker. On the other hand, a Speaker-dependent (SD) system is trained by an adequate amount of speaker-specific data and shows a better performance than the SI system. However, the SD system has drawbacks in that collecting a sufficient amount of data for each single speaker, in order to properly train the acoustic models, is time consuming and unacceptable in many cases. As a compromise, a Speaker Adaptation (SA) system attempts to tune the available recognition system to a specific speaker to improve recognition performance while requiring only a little amount of speaker-specific data.

FIG. 1 illustrates a general speaker adaptation method that utilizes a Maximum Likelihood Linear Regression (MLLR) technique by which speaker adaptation may be achieved using a minimized amount of data.

If a speaker says, "It is said that it is going to rain today" (S101), the utterance is converted into series of feature vectors, and then feature vectors are aligned with HMM states using the Viterbi alignment (S103). Then, a class tree configured using characteristics of models in an acoustic model space is used (S105), and a model transformation matrix is then estimated to transform the canonical model into a model suitable for a specific speaker (S107).

Herein, the basic unit of each model is a subword. In the class tree, the base classes C1, C2, C3 and C4 are connected to upper nodes C5 and C6 according to their phonological or aggregative characteristics in the acoustic model space. Accordingly, although a node C1 having data that are not sufficient to estimate a transformation matrix using a minimized number of utterances is generated, since a model of a cluster C1 may be transformed using the transformation matrix estimated at the upper node C5, speaker adaptation may be achieved with a minimized number of data.

A class configuration method using a phonological knowledge base and aggregative characteristics of acoustic model space is suggested in C. J. Leggetter, "Improved Acoustic Modeling for HMMs using Linear Transform" Ph. D thesis, Cambridge University, 1996 "Regression Class Generation based on Phonetic Knowledge and Acoustic Space". Such a method is, however, lacking in a mathematical basis and logic to support the hypothetical that phonemes of similar speech methods are located in a similar region in the acoustic model space. Additionally, there is a cluster difference between models before and after a speaker adaptation, but the method ignores the cluster difference. In other words, when clustering is performed using only a dispersion of models in an acoustic model space of a speaker-independent model before a speaker adaptation, models belonging to an arbitrary cluster may shift to other clusters after adapting to a speaker. Herein, since an identical parameter is applied to an identical cluster, speaker adaptation is resultantly performed in such shifted models by an erroneous transformation matrix.

In the meantime, the performance of a speaker adaptation system may be enhanced using a speaker clustering method for constituting acoustic models separately for each speaker group having a similar model dispersion in the acoustic model space.

U.S. Pat. No. 5,787,394, "State-dependent speaker clustering for speaker adaptation" discloses a speaker adaptation method that uses speaker clustering. According to the method of U.S. Pat. No. 5,787,394, the likelihood of all speaker models is analyzed when a speaker model cluster that is the most similar to a test speaker is selected. Thus, when the model similar to the test speaker model is not found in the selected speaker model cluster, a new prediction should be performed using another speaker cluster model. Accordingly, the amount of calculation is significant, and the calculation speed is also decreased. In addition, according to the method of U.S. Pat. No. 5,787,394, when a speaker model cluster that is most similar to a maximum likelihood (hereinafter, referred to as ML) model of a test speaker is selected, only a quantity variation amount is analyzed between the compared models, and the directional variation amount is disabled. Thus, even if the directional variation amounts are different from each other, if the quantity variation amounts are identical, the models may be bound in the same cluster.

SUMMARY OF THE INVENTION

The present invention relates to a method and an apparatus for both speaker clustering and speaker adaptation based on HMM model variation information. In particular, the present invention includes a method and an apparatus that yield an improved performance of automatic speech recognition in that it utilizes the average of model variation information over speakers. In addition, in analyzing the model variation, the present invention does not analyze only scalar information, but also analyzes vector information.

According to an aspect of the present invention, a speaker clustering method includes: extracting a feature vector from speech data of a plurality of training speakers; genera an ML (maximum likelihood) model of the feature vector for the plurality of training speakers; obtaining model variation information of the plurality of training speakers while analyzing the quantity variation amount and/or the directional variation amount in an acoustic space of the ML model with respect to a speaker-independent model; generating a plurality of speaker clusters by applying a predetermined clustering algorithm to the plurality of information on the model variation; and generating a transformation parameter to be used to generate a speaker adaptation model with respect to the speaker-independent model for the plurality of speaker group models.

Herein, the model variation is represented as Equation 1.

$$D(x,y) = D_{Eucledian}(x,y)^{\alpha}(1-\cos\theta) \qquad \text{Equation 1}$$

where x is a vector of an ML model of a training speaker;
y is a vector of a speaker-independent model of a training speaker;

$$D_{Eucledian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

α is a preselected weight; and
θ is an angle between the vectors x and y.

Herein, α may be 0 or 1.

In addition, in extracting a feature vector from the speech data of a plurality of training speakers, a plurality of feature vectors may be extracted from the training speakers. In generating an ML model of the feature vector for the plurality of training speakers, the Viterbi alignment may be performed on the feature vector.

A speaker adaptation method further includes: applying a predetermined clustering algorithm to the plurality of ML models, and generating a plurality of speaker group ML models. The generation of the speaker adaptation model includes: extracting a feature vector from the speech data of a test speaker; generating a test speaker ML model for the feature vector; calculating the model variation between the test speaker ML model and a speaker group ML model to which the test speaker belongs, and selecting a speaker group model that is most similar to the calculated model among the plurality of speaker group models; applying a predetermined prediction algorithm to a variation parameter of the selected speaker group model variation, and predicting and generating an adaptation parameter; and applying the adaptation parameter to the speaker adaptation model.

The calculated model variation may be represented as in Equation 1.

According to another aspect of the present invention, a speaker clustering method includes: extracting a feature vector from the speech data of a plurality of training speakers; generating an ML model of the feature vector for the plurality of training speakers; generating the model variation of the plurality of training speakers while analyzing the quantity variation amount and/or the directional variation amount in an acoustic space of the ML model with respect to a speaker-independent model; generating a global model variation representative of all of the plurality of model variations; and generating a variation parameter to be used to generate a speaker adaptation model with respect to the speaker-independent model using the global model variation.

The calculated model variation may be represented as Equation 1, and the global model variation may be an average of the plurality of model variations.

According to another aspect of the present invention, a speech recognition apparatus includes: a feature extractor which extracts a feature vector from the speech data of a plurality of training speakers; a Viterbi aligner, which performs Viterbi alignment on the feature vector with respect to a speaker-independent model for the plurality of training speakers, and generates an ML model with respect to the feature vector; a model variation generator which generates a model variations of the plurality of training speakers while analyzing the quantity variation amount and/or the directional variation amount in an acoustic space of the ML model with respect to a speaker-independent model; a model variation clustering unit which generates a plurality of speaker group model variations by applying a predetermined clustering algorithm to the plurality of model variations on the basis of the likelihood of the model variation; and a variation parameter generator which generates a variation parameter to be used to generate a speaker adaptation model with respect to the speaker-independent model, for the plurality of speaker group model variations.

The model variation clustering unit further applies a predetermined clustering algorithm to the plurality of ML models and generates a plurality of speaker group ML models; the feature extractor extracts a feature vector from the speech data of a test speaker, and then the Viterbi aligner generates a test speaker ML model for the feature vector, thus generating the speaker adaptation model. Herein, the apparatus further includes: a speaker cluster selector which calculates a model variation between the test speaker ML model and a speaker group ML model to which the test speaker belongs and selects a speaker group model that is most similar to the calculated model variation among the plurality of speaker group model; and an adaptation parameter generator which applies a predetermined prediction algorithm to a variation parameter of the selected speaker group model variation, predicts an adaptation parameter, generates the adaptation parameter, and applies the adaptation parameter to the speaker adaptation model.

According to another aspect of the present invention, a speech recognition apparatus includes: a feature extractor which extracts a feature vector from the speech data of a plurality of training speakers; a Viterbi aligner which performs Viterbi alignment on the feature vector with respect to a speaker-independent model for the plurality of training speakers, and generates an ML model with respect to the feature vector; a model variation generator which generates model variation of the plurality of training speakers while analyzing the quantity variation amount and/or the directional variation amount in an acoustic space of the ML model with respect to a speaker-independent model; a model variation clustering unit which generates a global model variation representative of all of the plurality of model variations; and a variation parameter generator which generates a variation parameter to be used to generate a speaker adaptation model with respect to the speaker-independent model using the global model variation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flowchart of a speaker clustering method according to yet another embodiment of the present invention;

FIG. 9 is an example of an experiment according to another embodiment of the present invention.

DETAILED DESCRIPTION OF THE PREFERRED EMBODIMENTS

Figure 1:
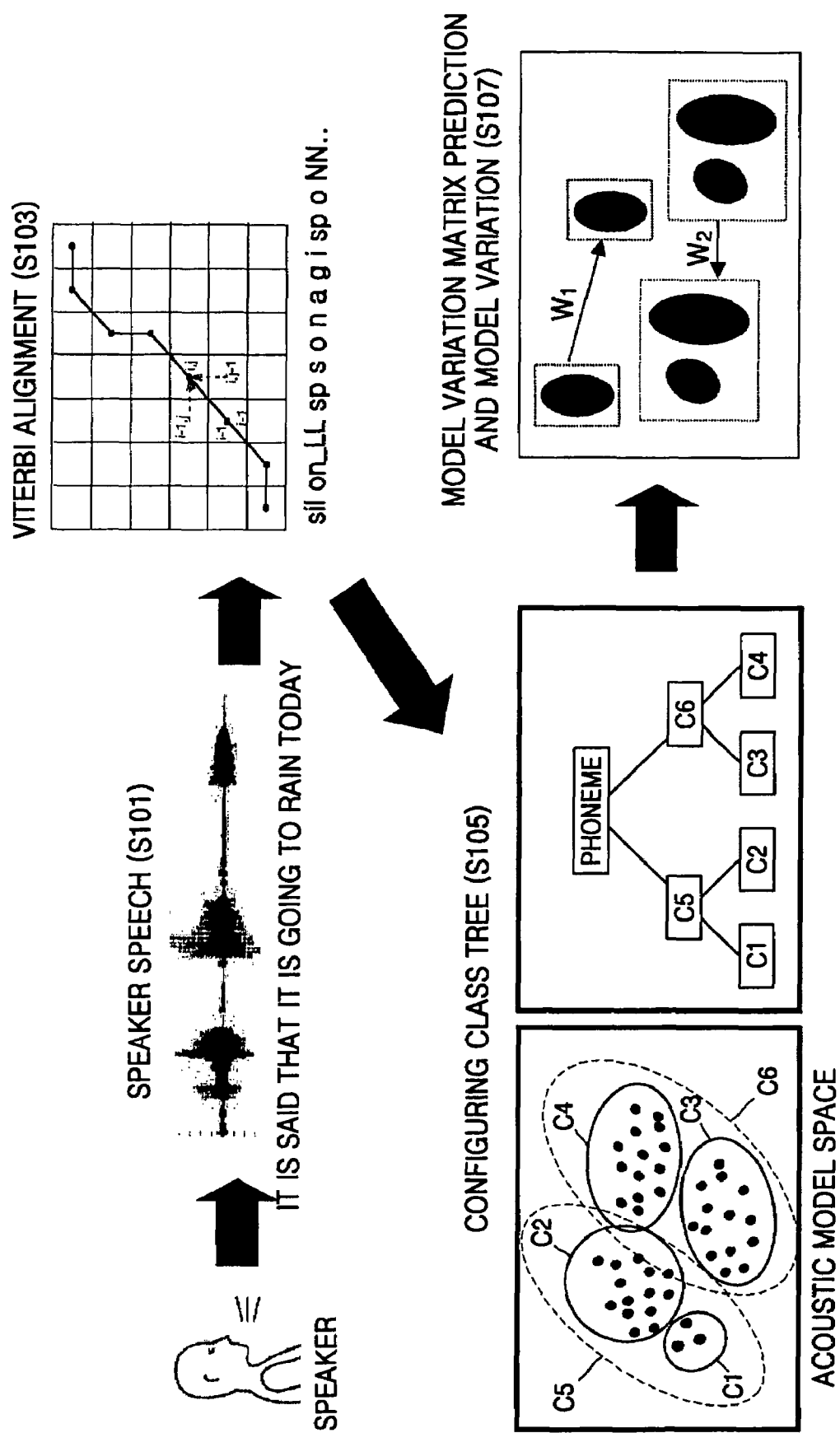
FIG. 1 illustrates a general speaker adaptation system according to an MLLR algorithm.

Reference will now be made in detail to the embodiments of the present invention, examples of which are illustrated in the accompanying drawings, wherein like reference numerals refer to the like elements throughout. The embodiments are described below to explain the present invention by referring to the figures.

Embodiments of the present invention will be described referring to accompanied drawings. A speech recognition process is divided into speaker clustering, speaker adaptation and speech recognition. The speaker clustering will be described referring to FIGS. 2 to 4. The speaker adaptation will be will be described referring to FIGS. 5 and 6. The speech recognition will be described referring to FIG. 7.

Figure 2:
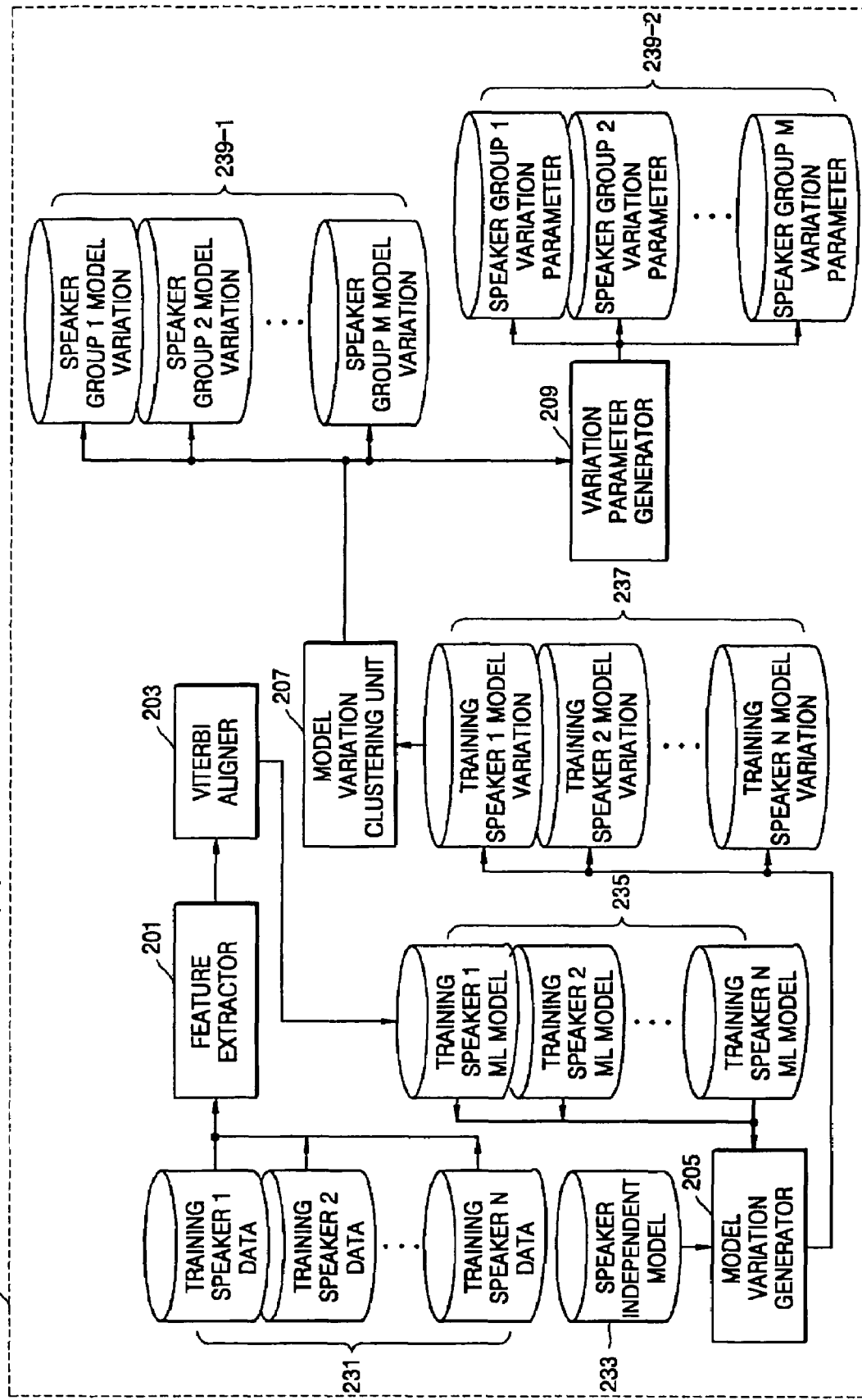
FIG. 2 illustrates a speech recognition apparatus which implements speaker clustering according to an embodiment of the present invention.

FIG. 2 illustrates a speech recognition apparatus which implements speaker clustering according to an embodiment of the present invention. The speech recognition apparatus 20 includes a feature extractor 201, a Viterbi aligner 203, a model variation generator 205, a model variation clustering unit 207 and a variation parameter generator 209. The feature extractor 201 extracts a feature vector used to recognize speech from the speech data 231 of N-numbered training speakers. The Viterbi aligner 203 performs the Viterbi alignment on the extracted feature vector using a Viterbi algorithm, and generates an ML model 235 of each training speaker. The model variation generator 205 generates a model variation 237 of each training speaker from the difference between a speaker-independent model 233 and the ML model 235 of the training speaker. The model variation clustering unit 207 generates M-numbered model variation groups 239-1 from the speakers on the basis of a likelihood of the model variation 237 of the training speakers. The variation parameter generator 209 predicts variation parameters for the plurality of speaker groups 239-1, and generates a variation parameter 239-2 for each speaker group.

The feature extractor 201 extracts a feature vector used to recognize speech. As the widely used feature vectors of a speech signal, there are feature vectors obtained by a linear predictive cepstrum (hereinafter, referred to as LPC) method, a mel frequency cepstrum (hereinafter, referred to as MFC) method, and a perceptual linear predictive (hereinafter, referred to as PLP) method. In addition, as the pattern recognition techniques for speech recognition, there are a dynamic time warping (hereinafter, referred to as DTW) technique and a neural network technique, which have problems which should be solved when applied to the recognition of significant amount of vocabulary. Accordingly, a speech recognition method using a hidden Markov model (hereinafter, referred to as HMM) is widely used today. As for HMM, many kinds of recognizers may be implemented from low capability to high capability, depending on model configurations only by setting a recognition unit according to a number of recognition words.

The Viterbi aligner 203 performs a Viterbi alignment on the feature vector for each training speaker using a Viterbi algorithm, and generates an ML model 235. The Viterbi algorithm is used to optimize a search space. The Viterbi algorithm may readily be implemented by hardware. The Viterbi algorithm is suitable for fields wherein energy efficiency is important. Accordingly, in the speech recognition fields, the Viterbi algorithm is usually used to determine the optimal state sequence. In other words, the Viterbi aligner 203 obtains the state sequence, using the Viterbi algorithm, which has the highest probability that an observation sequence of the feature vector is observed. Additionally, the Viterbi aligner 203 generates an ML model in which model parameters of speaker-independent model are newly predicted using a maximum likelihood estimation obtained by the well-known Baum-Welch algorithm. Herein, since a database for the same speaker is necessary to train a speaker's speech, various feature vectors are extracted from database 231 of each training speaker and are Viterbi-aligned in this embodiment. Then, a new variable is introduced to the ML model of a single observation sequence and the ML models 235 of the observation sequences of the feature vectors, that is, multiple observation sequences are generated.

The model variation generator 205 generates a model variation 237 of each training speaker from the difference between the ML model 235 of the training speaker and the speaker-independent model 233 in an acoustic space. Herein, the difference between models in the acoustic space is obtained when analyzing both the quantity variation amount and the directional variation amount. The speaker-independent model 233 is deliberately prepared before speaker adaptation, and represents an average trend for all the speakers. The speaker-independent model 233 may be a single model and may also be converted into a multiple model by clustering speakers according to sex, age and province.

Figure 3A:
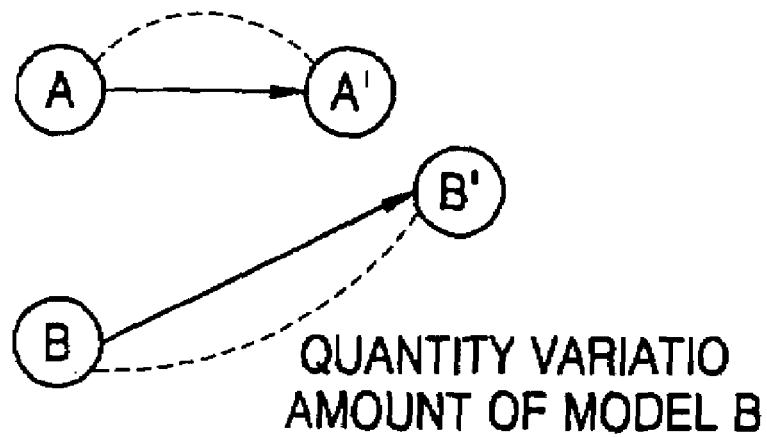
FIGS. 3A and 3B illustrate model variation according to another embodiment of the present invention.
Figure 3B:
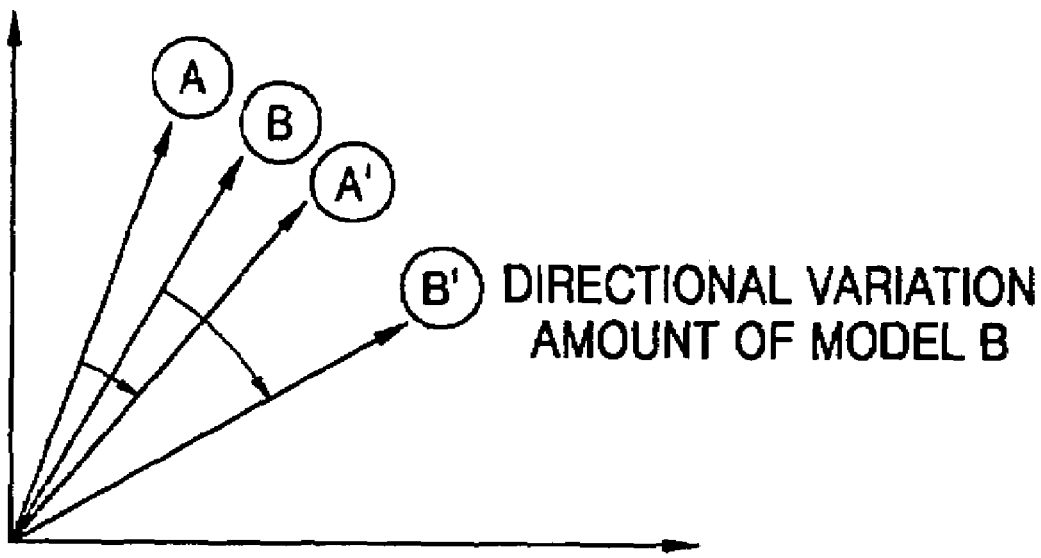

As shown FIG. 3A, the quantity variation amount represents a Euclidian distance between a speaker-independent model A or B and an ML model A' and B' of a training speaker. The directional variation amount represents an angular variation amount of the acoustic space between the speaker-independent model A or B and the ML model A' and B' of the training speaker, and is represented by Equation 1.

$$D(x,y) = D_{Euclidian}(x,y)^\alpha (1-\cos\theta) \quad \text{Equation 1}$$

where x is a vector of an ML model of a training speaker;

y is a vector of a speaker-independent model of a training speaker;

$D_{Euclidian}(x, y) = |x - y|^2$;

$\cos\theta = \dfrac{x \cdot y}{|x||y|}$;

$x = [x_1, x_2, \ldots, x_N]$;

$y = [y_1, y_2, \ldots, y_N]$;

α is a preselected weight; and

θ is an angle between the vectors x and y.

In other words, the difference between the speaker-independent model 233, and the ML model 237 of the training speaker causes model variation 237 according to Equation 1.

The model variation clustering unit 207 clusters the speakers into M-numbered model variation groups 239-1 from the speakers on the basis of a likelihood of the model variations 237 of the N-numbered training speakers. Herein, Equation 1 is used to determine model variations. As a clustering algorithm, the well-known Linde-Buzo-Gray (hereinafter, referred to as LBG) algorithm or K-means algorithm may be used. Meanwhile, although it is not separately shown that an acoustic characteristic is clear, the model variation clustering unit 207 generates M-numbered speaker group ML models corresponding to M-numbered speaker groups 239-1 in pairs from N-numbered ML models 235 of training speaker using clustering information for N-numbered model variations 237 of the training speaker. This speaker group ML model is used in the speaker adaptation method described later.

The variation parameter generator 209 predicts the variation parameters for the plurality of speaker groups 239-1 according to an MLE method, and generates a variation parameter 239-2 corresponding to each speaker group 239-1. The variation parameter 239-2 is used to predict an adaptation parameter when a speaker adaptation model is generated from a speaker-independent model in a speaker adaptation process to be described later. Herein, with respect to the variation parameters, the variation parameter generator 209 configures a priori-probability in the case of a maximum a posteriori (hereinafter, referred to as MAP) and a class tree in the case of maximum likelihood linear regression (hereinafter, referred to as MLLR) according to the speaker adaptation algorithm.

Then, referring to FIG. 2, a speaker clustering method according to another embodiment of the present invention shown in FIG. 4 will be described. In FIG. 4, feature vectors are extracted from the speech data 231 of N-numbered training speakers (S401). Then, a Viterbi alignment is performed on the feature vectors by a Viterbi algorithm (S403). An ML model 235 of the feature vector is generated from the feature vector for each training speaker (S405). Model variations of the training speakers are generated while analyzing the quantity variation amount and/or the directional variation amount from a speaker-independent model 233 to the ML model 235 of the training speaker (S407). The training speakers are clustered into M-numbered speaker groups 239-1 according to the model variation represented as Equation 1 (S409). Finally, a variation parameter is generated for each speaker group 239-1 (S411). Accordingly, the speaker clustering is completed according to the FIG. 2 embodiment of the present invention. M-numbered speaker group ML models corresponding to M-numbered speaker groups 329-1 in pairs are generated from ML models 235 of N-numbered training speakers using clustering information of S409. This speaker group ML model is used in a speaker adaptation method described later.

Figure 5:
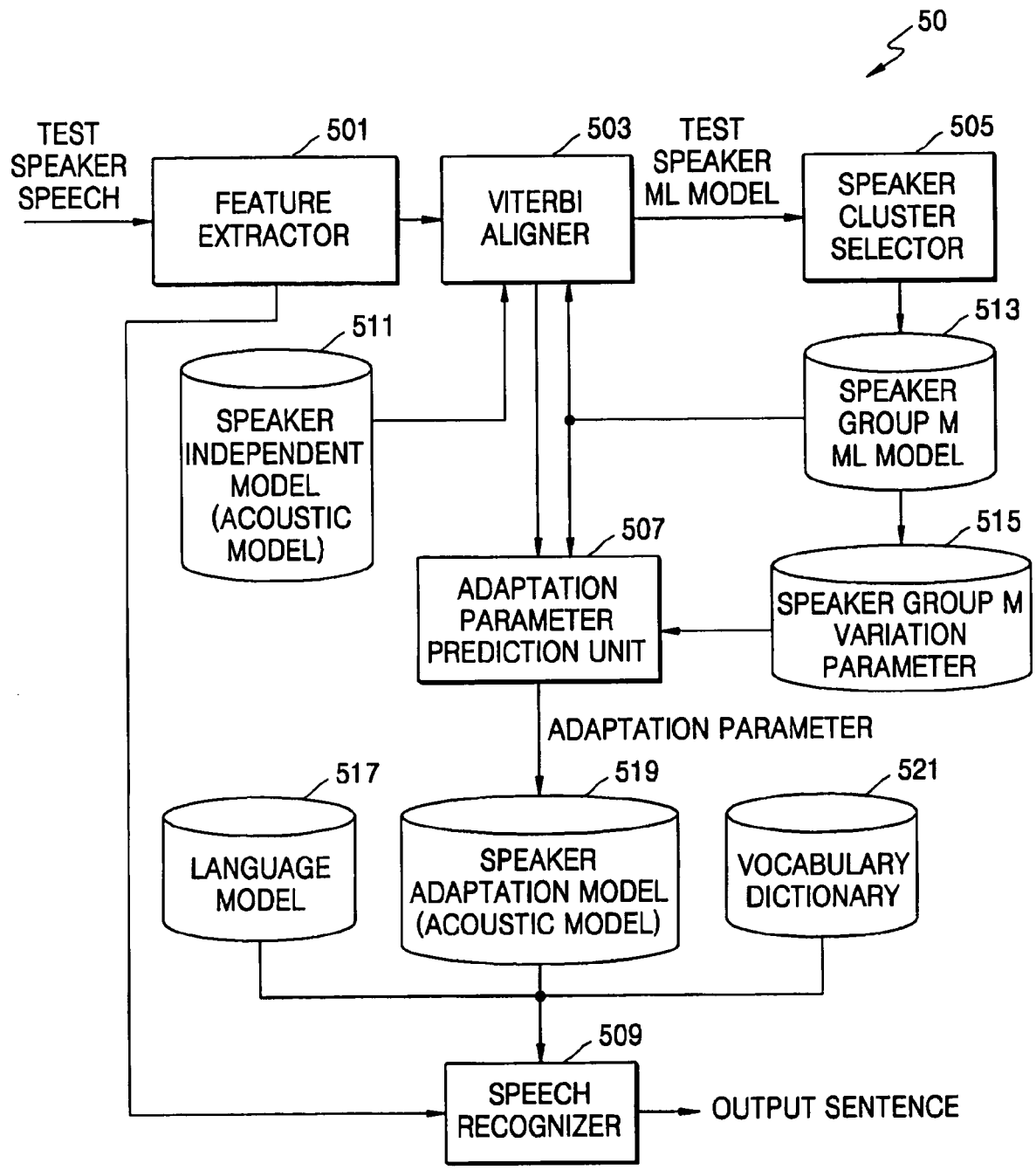
FIG. 5 illustrates a speech recognition apparatus which implements speaker adaptation according to another embodiment of the present invention.

FIG. 5 illustrates a speech recognition apparatus which implements a speaker adaptation according to another embodiment of the present invention. Referring to FIG. 5, the speaker adaptation process using M-numbered speaker group model variations and corresponding variation parameters 239-2 generated according to FIGS. 2 and 4 will be described.

A speech recognition apparatus 50 includes a feature extractor 501, a Viterbi aligner 503, a model variation generator 505, an adaptation parameter predictor 507, and a speech recognizer 509. The feature extractor 501 extracts a feature vector used to recognize speech from a test speaker. The Viterbi aligner 503 performs a Viterbi alignment on the extracted feature vector with respect to parameters of a speaker-independent model 511 according to a Viterbi algorithm in a speech space, and generates an ML model of the test speaker of the feature vector. The model variation generator 505 calculates a model variation between the test speaker ML model and a speaker group ML model 513 to which the test speaker belongs, and selects a speaker group that has a speaker group model variation that is most similar to the calculated model variation among the speaker groups 239-1. The adaptation parameter predictor 507 applies an MLE method to a variation parameter of the selected speaker group model variation and predicts an adaptation parameter. The speech recognizer 509 outputs a feature vector of the speech of the speaker in a sentence referring to the speaker adaptation model 519 and the vocabulary dictionary 521.

The feature extractor 501 extracts a feature vector used to recognize speech. As the widely used feature vectors of a speech signal, there are feature vectors obtained by an LPC method, an MFC method and a PLP method.

The Viterbi aligner 503 performs Viterbi alignment on the feature vectors with respect to parameters of the speaker-independent model 511 according to a Viterbi algorithm, and generates ML models of the feature vectors. The speaker-independent model 511 is deliberately prepared before the speaker adaptation. It represents an average trend for all the speakers. The speaker-independent model 511 may cluster speakers according to sex, age and province. The speaker cluster selector 505 selects the speaker group model variation 513. Then, the Viterbi aligner 503 performs a speaker group model variation 513, a Viterbi alignment and an ML prediction on the test speaker ML model.

The speaker cluster selector 505 calculates model variation between the test speaker ML model and the speaker group ML model (generated when clustering speakers referring to FIGS. 2 and 4) to which the test speaker belongs, and selects a speaker group that has a speaker group model variation that is most similar to the calculated model variation among the speaker groups 239-1. Herein, the speaker cluster selector 505 measures the likelihood of a model variation while analyzing both the directional variation amount and quantity variation amount according to Equation 1 so as to select a speaker group. Herein, the speaker cluster selector 505 provides the Viterbi aligner 503 and the adaptation parameter predictor 507 with the model variation 513 of the selected speaker group, and provides the adaptation parameter predictor 507 with the variation parameter 515 of the selected speaker group.

The adaptation parameter predictor 507 predicts the adaptation parameter from the variation parameter 515 of the selected speaker group on the basis of the alignment result of the Viterbi aligner and the model variation 513 of the selected speaker group, and applies the adaptation parameter to the speaker adaptation model 519. Accordingly, the parameters of the speaker adaptation model are transformed in the acoustic space by the adaptation parameter. Then, the adaptation parameter predictor 507 repeats the process of receiving the speech from a test speaker, predicting an adaptation parameter and applying the adaptation parameter to the speaker adaptation model. When the speaker adaptation is completed, the speaker recognizer 509 outputs the input speech of the test speaker in a sentence referring to a language model 517, a speaker adaptation model 519, and the vocabulary dictionary.

For example, in the case of MAP, priori probability is obtained using an expectation maximization (hereinafter, referred to as EM) algorithm so that the difference between the limited training data (speaker adaptation registration data) and the existing speaker-independent model is minimized, and then the limited training data is applied to speaker adaptation model using the obtained priori probability. In the case of MLLR, a variation matrix that matches the existing speaker-independent model to the speaker using the limited training data (speaker adaptation registration data) is predicted, and then the limited training data is transformed into a speaker adaptation model using the predicted variation matrix.

In the meantime, the language model 517, the speaker adaptation model 519 and the vocabulary dictionary 521 are obtained beforehand in a learning process. The language model 517 has a bigram or trigram occurrence probability data of a word sequence operated using occurrence frequency data for a word sequence of learning sentences constructed in a learning text database. The learning text database may consist of sentences that may be used to recognize speech. The speaker adaptation model 519 generates acoustic models such as a hidden Markov model (hereinafter, referred to as HMM) using the feature vectors of the speaker extracted from the speech data of the learning speech database. The acoustic models are used as reference models in a speech recognition process. Since a recognition unit, to which a phonological change is applied, should be processed, the vocabulary dictionary 521 is a database in which all the pronunciation representations, including a phonological change are included for all the headwords.

Figure 6:
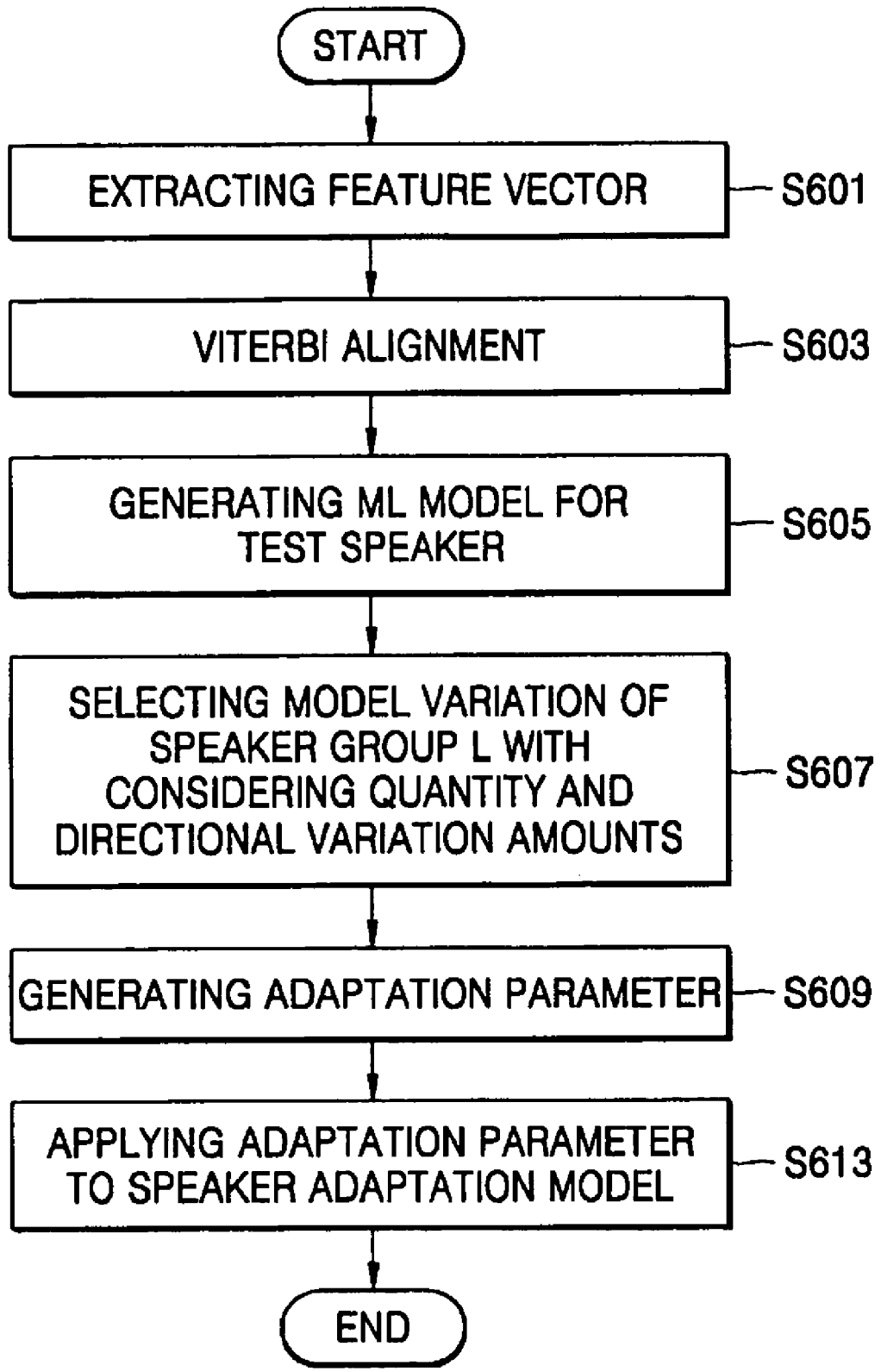
FIG. 6 is a flowchart of a speaker adaptation method according to another embodiment of the present invention.

FIG. 6 is a flowchart of a speaker adaptation method according to another embodiment of the present invention. Referring to FIG. 6, feature vectors used to recognize the words of speech are extracted from the speech data of a test training speaker (S601). Then, the feature vectors are aligned for ML with respect to the parameters of the speaker-independent model 511 according to the Viterbi algorithm, and the ML model of the test speaker is generated (S603, S605). Then, a model variation is measured while analyzing both the quantity variation amount and the directional variation amount of the model according to Equation 1, and then a speaker group 513 and the variation parameter of the speaker group 513 are selected (S607). Then, the adaptation parameter is predicted and generated from the variation parameter 515 of the selected speaker group on the basis of the Viterbi alignment result and model variation 513 of the selected speaker group L (S609), and then the generated adaptation parameter is applied to the speaker adaptation model (S613).

Figures 7, 8:
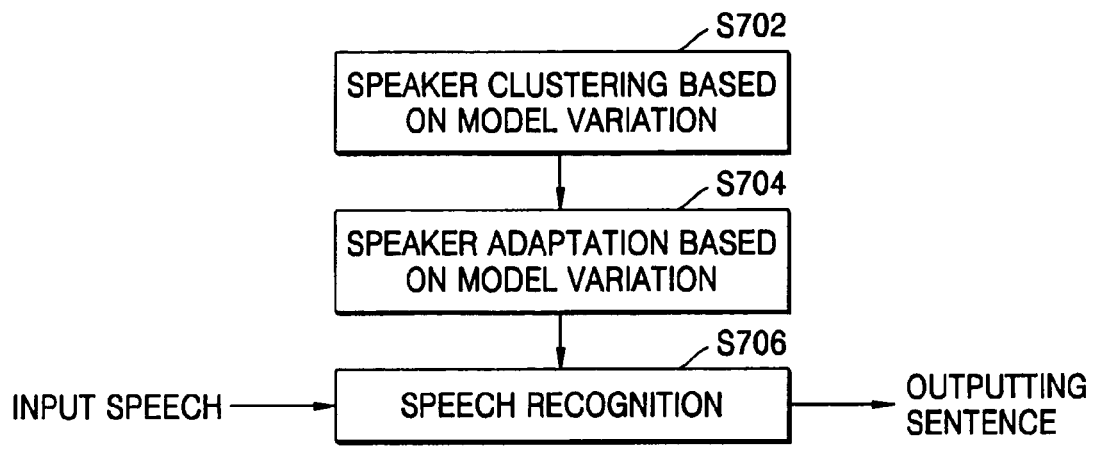
FIG. 7 is a flowchart of a speech recognition method according to another embodiment of the present invention.
FIG. 8 is an example of an experiment according to another embodiment of the present invention.

FIG. 7 is a flowchart of a speech recognition method according to another embodiment of the present invention. When the speaker clustering based on a model variation described referring to FIGS. 2 to 4 (S702) and the speaker adaptation based on a model variation described referring to FIGS. 5 and 6 (S704) are performed and a speaker adaptation is completed, speech is received from a speaker, and the sentence corresponding to the received speech is outputted (S706).

Referring to FIGS. 8 and 9, experimental results according to the embodiment of the present invention will be described. FIG. 8 is a result of an experiment according to another embodiment of the present invention in which a model variation is generated for each of the training speakers while analyzing the quantity variation amount and the directional variation amount according to Equation 1 without applying speaker clustering to this embodiment, and speaker adaptation is performed using the model variations.

Accordingly, a model variation clustering unit 207 does not generate a speaker cluster, but generates a global model variation representative of N-numbered training speaker model variations 237. Herein, the global model variations may be an average of all the training speaker model variations 237. For example, the number of models is K. N-numbered training speaker model variations are speaker 1={d1_1, d1_2, d1_3, . . . , d1_K}, speaker 2={d2_1, d2_2, d2_3, . . . , d2_K}, . . . , speaker N={dN_1, dN_2, dN_3, . . . , dN_K}, where d is the difference between the speaker-independent model and the ML model for the speakers. Herein, the global model variation may be represented as {m1, m2, m3, . . . , mk} where m1=(d1_1+d2_1+d3_1+ . . . +dN_1)/N, m2=(d1_2+d2_2+d3_2+ . . . +dN_2)/N, . . . , mk=(d1_k+d2_k+d3_k+ . . . +dN_k)/N. In addition, a variation parameter generator 209 predicts a variation parameter to be used to generate a speaker adaptation model using the global model variation and generates the variation parameter according to the MLE method.

Meanwhile, the description of the model variation clustering unit 207 will be omitted. Instead, the model variations 237 of N-numbered training speakers may have N-numbered corresponding variation parameters instead of a speaker group variation parameter 239-2. Herein, the speaker cluster selector 505 of FIG. 5 selects a model variation of a specific training speaker directly from model variations 237 and corresponding variation parameters of N-numbered training speakers. The adaptation parameter predictor 507 then generates an adaptation parameter on the basis of a model variation of this specific training speaker.

In the experiment, the speech data obtained by reading a colloquial sentence as narration were used. A total of 4,500 speech sentences were used as the experimental data, the speech sentences including 1,500 adaptation speeches for speaker adaptation and 3,000 test speeches for experiment. Fifty adaptation speech sentences and one hundred test speech sentences were obtained from fifteen men and fifteen women. Each speech sentence was collected using a Sennheizer MD431 unidirectional microphone in a quiet office environment. Additionally, MLLR was used as an adaptation algorithm. The training speakers constituting a model included twenty-five men and twenty-five women. The number of base classes constituting the lowest layer in the class tree of each model is sixty-four.

In the meanwhile, referring to FIG. 8, comparative examples 1 and 2 are a phonological knowledge based speaker adaptation model and a location likelihood based speaker adaptation model. The weights of experimental examples 1, 2 and 3 are given as α, 0 and 1. A word error rate (hereinafter, referred to as WER) is used generally to measure an error rate in speech recognition. The relative WER reduction rate represents how much the error rate is reduced in comparison with the WER of speaker-independent model.

As shown in FIG. 8, even in the case that the speaker adaptation is performed without clustering the speaker, the WERs (%) of the experimental examples 1, 2 and 3 are 2.94, 2.78 and 2.79, respectively, and represent the relative WER reduction rate of 26.1%, 30.2% and 29.9% in comparison with the speaker-independent WER, respectively. In comparison with the existing speaker adaptation method suggested as a comparative example, it was found that the relative WER reduction rate was improved by about 10%. Generally, in a speech recognition apparatus having more than 95%, this recognition performance improvement is significant when the relative difficulty of recognition performance improvement is taken into account. Herein, note that the WER was more improved in the case in which only the directional variation amount was analyzed (2.78%, 2.79%) rather than the case in which only quantity variation amount was analyzed (2.94%). Accordingly, the directional variation amount is a more significant factor in the speech recognition performance.

Meanwhile, as for the experimental example 2 shown in FIG. 8, in the experimental examples 4 and 5 in which a speaker is clustered with eight and sixteen speaker clusters, the WER and relative WER reduction rate have greater improvements than the rates obtained using the comparative examples 1 and 2, as shown in FIG. 9.

The speaker clustering method and the speaker adaptation method may be implemented by programs stored on a computer readable recording medium. The recording medium includes a carrier wave, such as transmission through the Internet, as well as an optical recording medium and a magnetic recording medium.

According to the present invention, in measuring a model variation, the directional variation amount, as well as a quantity variation amount, is analyzed so that the speaker cluster accuracy is improved.

According to the present invention, in measuring a model variation likelihood when the speaker cluster is selected, the directional variation amount, as well as the quantity variation amount, is analyzed so that the accuracy of the speaker cluster selection is improved.

According to the present invention, when a model variation is measured, both the quantity variation amount and the directional variation amount are analyzed so that the error rate of speech recognition is drastically lowered.

The invention may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, and optical data storage device. The computer readable recording medium may also be distributed over network coupled computer systems so that the computer readable code is stored and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A speaker clustering method comprising:
extracting a feature vector from speech data of input speech signals of a plurality of training speakers;
generating an ML (maximum likelihood) model of the feature vector for the plurality of training speakers;
generating model variations of the plurality of training speakers while analyzing a quantity variation amount and/or directional variation amount in an acoustic space of the ML model with respect to a speaker-independent model;
generating a plurality of speaker group model variations by applying a predetermined clustering algorithm to the plurality of model variations on the basis of model variations; and
generating a variation parameter that is used to generate, in a speech recognition apparatus, a speaker adaptation model with respect to the speaker-independent model, for the plurality of speaker group model variations,
wherein the speech recognition apparatus utilizes the speaker adaptation model to output a sentence, and
wherein the model variation is represented as follows:

$$D(x, y) = D_{Euclidian}(x, y)^\alpha (1-\cos\theta)$$

where x is a vector of an ML model of a training speaker;
y is a vector of a speaker-independent model of a training speaker;

$$D_{Eucledian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

$\alpha$ is a preselected weight; and
$\theta$ is an angle between the vectors x and y,
wherein the generating the variation parameter includes configuring a priori-probability in the case of a maximum a posteriori and a class tree in a case of maximum likelihood linear regression in accordance with the speaker adaptation algorithm.

2. The method of claim 1, wherein $\alpha=0$.

3. The method of claim 1, wherein $\alpha=1$.

4. The method of claim 1, wherein, in extracting the feature vector from the speech data of the input speech signals of the plurality of training speakers, a plurality of feature vectors are extracted from the training speakers.

5. The method of claim 1, wherein, in generating the ML model of the feature vector for the plurality of training speakers, a Viterbi alignment is performed on the feature vector.

6. The method of claim 1, wherein the generating the plurality of speaker group model variations by applying the predetermined clustering algorithm includes using as the predetermined clustering algorithm one of: a Linde-Buzo-Gray algorithm or a K-means algorithm.

7. A speaker adaptation method comprising the speaker clustering method of claim 1, further comprising:
applying a predetermined clustering algorithm to the plurality of ML models, and generating a plurality of speaker group ML models,
wherein the generation of the speaker adaptation model comprises:
extracting a feature vector from speech data of an input speech signal of a test speaker;
generating a test speaker ML model for the feature vector;
calculating model variation between the test speaker ML model and a speaker group ML model to which the test speaker belongs and selecting a speaker group model variation that is most similar to the calculated model variation among the plurality of speaker group model variations;
applying a predetermined prediction algorithm to a variation parameter of the selected speaker group model variation, and predicting and generating an adaptation parameter; and
applying the adaptation parameter to the speaker adaptation model in the speech recognition apparatus prior to outputting the sentence.

8. A computer-readable recording storage medium having embodied thereon a computer program having computer-executable instructions to execute a speaker clustering method, the instructions comprising:
extracting a feature vector from speech data of input speech signals of a plurality of training speakers;
generating an ML (maximum likelihood) model of the feature vector for the plurality of training speakers;
generating model variations of the plurality of training speakers while analyzing a quantity variation amount and/or directional variation amount in an acoustic space of the ML model with respect to a speaker-independent model;

generating a plurality of speaker group model variations by applying a predetermined clustering algorithm to the plurality of model variations on a basis of the model variations; and generating a variation parameter that is used to generate, in a speech recognition apparatus, a speaker adaptation model with respect to the speaker-independent model, for the plurality of the speaker group model variations, wherein the speech recognition apparatus utilizes the speaker adaptation model to output a sentence, and wherein the model variation is represented as follows:

$$D(x, y) = D_{Eucildian}(x, y)^\alpha (1 - \cos \theta)$$

where x is a vector of an ML model of a training speaker; y is a vector of a speaker-independent model of a training speaker;

$$D_{Eucledian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

α is a preselected weight; and

θ is an angle between the vectors x and y, wherein the generating the variation parameter includes configuring a priori-probability in the case of a maximum a posteriori and a class tree in a case of maximum likelihood linear regression in accordance with the speaker adaptation algorithm.

9. A computer-readable recording storage medium having embodied thereon a computer program to execute a speaker adaptation method comprising the speaker clustering method of claim 8, further comprising:

applying a predetermined clustering algorithm to the plurality of ML models, and generating a plurality of speaker group ML models, wherein the generation of the speaker adaptation model comprises:
extracting a feature vector from speech data of an input speech signal of a test speaker;
generating a test speaker ML model for the feature vector;
calculating model variation between the test speaker ML model and a speaker group ML model to which the test speaker belongs and selecting a speaker group model variation that is most similar to the calculated model variation among the plurality of speaker group model variations;
applying a predetermined prediction algorithm to a variation parameter of the selected speaker group model variation in a speech recognition apparatus, and predicting and generating an adaptation parameter; and
applying the adaptation parameter to the speaker adaptation model,
wherein the speech recognition apparatus utilizes the speaker adaptation model to output a sentence.

10. The computer-readable recording storage medium of claim 8, wherein the generating the plurality of speaker group model variations by applying the predetermined clustering algorithm includes using as the predetermined clustering algorithm one of: a Linde-Buzo-Gray algorithm or a K-means algorithm.

11. A speaker clustering method comprising:
extracting a feature vector from speech data of input speech signals of a plurality of training speakers;
generating an ML model of the feature vector for the plurality of training speakers;
generating model variations of the plurality of training speakers while analyzing quantity variation amount and/or directional variation amount in an acoustic space of the ML model with respect to a speaker-independent model;
generating a global model variation representative of all of the plurality of model variations; and
generating a variation parameter that is used to generate, in a speech recognition apparatus, a speaker adaptation model with respect to the speaker-independent model using the global model variation,
wherein the speech recognition apparatus utilizes the speaker adaptation model to output a sentence, and
wherein the model variation is represented as follows:

$$D(x, y) = D_{Eucildian}(x, y)^\alpha (1 - \cos \theta)$$

where x is a vector of an ML model of a training speaker; y is a vector of a speaker-independent model of a training speaker;

$$D_{Eucledian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

α is a preselected weight; and

θ is an angle between the vectors x and y, wherein the generating the variation parameter includes configuring a priori-probability in the case of a maximum a posteriori and a class tree in a case of maximum likelihood linear regression in accordance with the speaker adaptation algorithm.

12. The method of claim 11, wherein the global model variation is an average of the plurality of model variations.

13. A computer-readable storage medium having embodied thereon a computer program having computer-executable instructions to execute a speaker clustering method, the computer-executable instructions comprising:
extracting a feature vector from speech data of input speech signals of a plurality of training speakers;
generating an ML model of the feature vector for the plurality of training speakers;
generating model variations of the plurality of training speakers while analyzing quantity variation amount and/or directional variation amount in an acoustic space of the ML model with respect to a speaker-independent model;
generating a global model variation representative of all of the plurality of model variations; and
generating a variation parameter that is used to generate, in a speech recognition apparatus, a speaker adaptation model with respect to the speaker-independent model using the global model variation,
wherein the speech recognition apparatus utilizes the speaker adaptation model to out put a sentence, wherein the generating the variation parameter includes configuring a priori-probability in the case of a maximum a posteriori and a class tree in a case of maximum likelihood linear regression in accordance with the speaker adaptation algorithm.

14. A speech recognition apparatus comprising:
a feature extractor which extracts a feature vector from speech data of input speech signals of a plurality of training speakers;
a Viterbi aligner which performs a Viterbi alignment on the feature vector with respect to a speaker-independent model for the plurality of training speakers, and generates an ML model with respect to the feature vector;
a model variation generator which generates model variations of the plurality of training speakers while analyzing quantity variation amount and/or directional variation amount in an acoustic space of the ML model with respect to a speaker-independent model;
a model variation clustering unit which generates a plurality of speaker group model variations by applying a predetermined clustering algorithm to the plurality of model variations on a basis of a likelihood of the model variations; and
a variation parameter generator which generates a variation parameter that is used to generate, in a speech recognition apparatus, a speaker adaptation model with respect to the speaker-independent model, for the plurality of speaker group model variations,
wherein the speech recognition apparatus utilizes the speaker adaptation model to out put a sentence, and
wherein the model variation is represented as follows:

$$D(x, y) = D_{Euclidian}(x, y)^\alpha (1 - \cos \theta)$$

where x is a vector of an ML model of a training speaker;
y is a vector of a speaker-independent model of a training speaker;

$$D_{Eucledian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

$\alpha$ is a preselected weight; and
$\theta$ is an angle between the vectors x and y,
wherein the variation parameter generator configures a priori-probability in the case of a maximum a posteriori and a class tree in a case of maximum likelihood linear regression in accordance with the speaker adaptation algorithm.

15. The apparatus of claim 14, wherein $\alpha = 0$.
16. The apparatus of claim 14, wherein $\alpha = 1$.
17. The apparatus of claim 14, wherein the feature extractor extracts a plurality of feature vectors from the training speakers.
18. The apparatus of claim 14, wherein:
the model variation clustering unit further applies a predetermined clustering algorithm to the plurality of ML models and generates a plurality of speaker group ML models; and
the feature extractor extracts a feature vector from speech data of a test speaker and the Viterbi aligner generates a test speaker ML model for the feature vector, to generate the speaker adaptation model; and wherein the apparatus further comprises:
a speaker cluster selector which calculates model variation between the test speaker ML model and a speaker group ML model to which the test speaker belongs and selects a speaker group model variation that is most similar to the calculated model variation among the plurality of speaker group model variations; and
an adaptation parameter generator which applies a predetermined prediction algorithm to a variation parameter of the selected speaker group model, predicts an adaptation parameter, generates the adaptation parameter and applies the adaptation parameter to the speaker adaptation model.

19. The apparatus of claim 18, wherein the model variation calculated by the speaker cluster selector is represented as follows:

$$D(x, y) = D_{Euclidian}(x, y)^\alpha (1 - \cos \theta)$$

where x is a vector of an ML model of a training speaker;
y is a vector of a speaker-independent model of a training speaker;

$$D_{Eucledian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

$\alpha$ is a preselected weight; and
$\theta$ is an angle between the vectors x and y.

20. The apparatus of claim 18, further comprising: a speech recognizer that outputs a feature vector of arbitrary speech data which uses the speaker adaptation model.
21. The apparatus of claim 17, wherein the model variation clustering unit utilizes as the predetermined clustering algorithm one of: a Linde-Buzo-Gray algorithm or a K-means algorithm.
22. A speech recognition apparatus comprising:
a feature extractor which extracts a feature vector from speech data of input speech signals, of a plurality of training speakers;
a Viterbi aligner which performs a Viterbi alignment on the feature vector with respect to a speaker-independent model for the plurality of training speakers, and generates an ML model with respect to the feature vector;
a model variation generator which generates model variations of the plurality of training speakers while analyzing a quantity variation amount and/or a directional variation amount in an acoustic space of the ML model with respect to a speaker-independent model;
a model variation clustering unit which generates a global model variation representative of all of the plurality of model variations; and
a variation parameter generator which generates a variation parameter that is used to generate, in a speech recognition apparatus, a speaker adaptation model with respect to the speaker-independent model using the global model variation,
wherein the speech recognition apparatus utilizes the speaker adaptation model to out put a sentence, and
wherein the model variation is represented as follows:

$$D(x, y) = D_{Euclidian}(x, y)^\alpha (1 - \cos \theta)$$

where x is a vector of an ML model of a training speaker;

y is a vector of a speaker-independent model of a training speaker;

$$D_{Euclidian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

α is a preselected weight; and
θ is an angle between the vectors x and y,
wherein the variation parameter generator configures a priori-probability in the case of a maximum a posteriori and a class tree in a case of maximum likelihood linear regression in accordance with the speaker adaptation algorithm.

23. The apparatus of claim 22, wherein the global model variation is an average of the plurality of model variations.

24. A speech recognition method comprising:
performing speaker clustering and speaker adaptation based on input speech signals using average model variation information over speakers while analyzing a quantity variation amount and a directional variation amount,
wherein, in performing the speaker clustering, a speaker group model variation is generated based on a model variation between a speaker-independent model and a training speaker ML model, and, in performing the speaker adaptation, a model in which the model variation between a test speaker ML model and a speaker group ML model to which a test speaker belongs which is most similar to a training speaker group model variation is selected; and
performing speaker adaptation on the selected model in a speech recognition apparatus extracting a feature vector from speech data of input speech signals of a plurality of training speakers,
wherein the speech recognition apparatus outputs a sentence, and
wherein the model variation is represented as follows:

$$D(x, y) = D_{Euclidian}(x, y)^\alpha (1 - \cos\theta)$$

where x is a vector of an ML model of a training speaker;
y is a vector of a speaker-independent model of a training speaker;

$$D_{Euclidian}(x, y) = |x - y|^2;$$
$$\cos\theta = \frac{x \cdot y}{|x||y|};$$
$$x = [x_1, x_2, \ldots, x_N];$$
$$y = [y_1, y_2, \ldots, y_N];$$

α is a preselected weight; and
θ is an angle between the vectors x and y,
wherein, in performing the speaker clustering, the a variation parameter is generated that includes configuring a priori-probability in the case of a maximum a posteriori and a class tree in a case of maximum likelihood linear regression in accordance with the speaker adaptation algorithm.

25. The speech recognition method of claim 24, wherein the model variation in the speaker clustering and the speaker adaptation are calculated while analyzing both the quantity variation amount and the directional variation amount.

* * * * *

UNITED STATES PATENT AND TRADEMARK OFFICE
CERTIFICATE OF CORRECTION

PATENT NO.         : 7,590,537 B2                                       Page 1 of 1
APPLICATION NO.    : 11/020302
DATED              : September 15, 2009
INVENTOR(S)        : Namhoon Kim et al.

It is certified that error appears in the above-identified patent and that said Letters Patent is hereby corrected as shown below:

Column 12, Line 5, change "$D_{Eucledian}$" to --$D_{Euclidian}$--.

Column 13, Line 15, change "$D_{Eucildian}$" to --$D_{Euclidian}$--.

Column 13, Line 22, change "$D_{Eucledian}$" to --$D_{Euclidian}$--.

Column 14, Line 30, change "$D_{Eucledian}$" to --$D_{Euclidian}$--.

Column 14, Line 67, change "out put" to --output--.

Column 15, Line 30, change "out put" to --output--.

Column 15, Line 39, change "$D_{Eucledian}$" to --$D_{Euclidian}$--.

Column 16, Line 24, change "$D_{Eucledian}$" to --$D_{Euclidian}$--.

Column 16, Line 37, change "claim 17," to --claim 14,--.

Column 16, Line 63, change "out put" to --output--.

Signed and Sealed this

Eighth Day of December, 2009

David J. Kappos
*Director of the United States Patent and Trademark Office*